United States Patent [19]

Adams

[11] Patent Number: 4,651,523
[45] Date of Patent: Mar. 24, 1987

[54] INTEGRAL ROCKET AND RAMJET ENGINE

[75] Inventor: Ronald J. Adams, Surrey, Canada

[73] Assignee: Rolls-Royce plc, London, England

[21] Appl. No.: 780,432

[22] Filed: Sep. 26, 1985

[30] Foreign Application Priority Data

Oct. 6, 1984 [GB] United Kingdom ............... 8425293

[51] Int. Cl.$^4$ .......................... F02K 3/00; F02K 7/00; F02K 9/00
[52] U.S. Cl. ...................................... 60/245; 60/270.1
[58] Field of Search ...................... 60/245, 251, 270.1, 60/917, 244

[56] References Cited

U.S. PATENT DOCUMENTS

| | | | |
|---|---|---|---|
| 2,684,570 | 7/1954 | Nordfors | 60/245 |
| 3,724,216 | 4/1973 | Smith, Jr. | 60/245 |
| 4,000,613 | 1/1977 | Fukomoto et al. | 60/251 |
| 4,031,698 | 6/1977 | Humphrey et al. | 60/251 |
| 4,050,243 | 9/1977 | Holzman et al. | 60/245 |
| 4,391,094 | 7/1983 | Engel et al. | 60/245 |

FOREIGN PATENT DOCUMENTS 590177 7/1947 United Kingdom ............... 60/245

Primary Examiner—Louis J. Casaregola
Assistant Examiner—Timothy S. Thorpe
Attorney, Agent, or Firm—Parkhurst & Oliff

[57] ABSTRACT

An integral rocket and ramjet engine (16) comprises, in flow series, an intake duct (18) for aerodynamically compressing air, a port cover (30), a combustion chamber (20) and a propelling nozzle (22). The port cover (30) in a first position prevents air from entering the combustion chamber (20) and enables a rocket charge (24) to be burnt in the combustion chamber (20) thereby accelerating the engine to sufficient velocity for ramjet operation. The port cover (30) is movable axially to a second position when the rocket charge (24) is spent to allow compressed air into the combustion chamber (20) and the engine (16) to operate as a ramjet. In the second position the port cover (30) provides a quiet zone (52) which is substantially shielded from the main flow of air into the combustion chamber. Combustion equipment such as primary and main fuel manifolds (42,46) and flame gutters (50) are also movable with the port cover (30).

7 Claims, 2 Drawing Figures

INTEGRAL ROCKET AND RAMJET ENGINE

BACKGROUND AND SUMMARY OF THE INVENTION

The invention relates to an integral rocket and ramjet engine of the type suitable for use in a missile.

A missile ramjet engine operates by aerodynamically compressing air in an intake duct, burning fuel in a combustion chamber, the combustion being supported by the compressed air and then ejecting the resultant hot gases through a propelling nozzle in which the hot gases expand thereby attaining a high velocity rearward relative to the direction of the missile.

It is known to use a detachable rocket engine to accelerate the missile up to high speed in order to sufficiently compress air in the intake duct to commence operation of the ramjet. After the missile reaches a high enough velocity for the ramjet to be self-sustaining the rocket engine is discarded.

To save space and weight, it is also known to provide a rocket grain within the ramjet combustion chamber for initial acceleration of the missile. The integral rocket and ramjet engine has drawbacks such as the propelling nozzle size needs to change when the engine converts from a rocket to a ramjet. Also, during the period in which the rocket charge burns it is necessary to seal off the air intake from the combustion chamber to prevent efflux from the rocket charge travelling via the intake duct to atmosphere. The means used to seal off the air intake needs to be able to withstand the very high gas pressure generated by the burning charge as well.

The former drawback has largely been overcome by housing the rocket nozzle within the ramjet nozzle and during transition from rocket to ramjet operation ejecting the rocket nozzle from the missile by various known means. Another solution is to burn away the rocket nozzle during transition.

The latter drawback hitherto has been overcome by having one or more covers between the air intake duct and combustion chamber which are ejected from the missile during transition by convenient means. Jettisoning the covers creates two main problems. First, the ejected covers become a hazard, especially to aircraft in the case of an air launched missile. Secondly, after the covers have been jettisoned there will invariably be some form of sudden enlargement between the intake duct and combustion chamber which is used as a pilot combustion region. This feature involves a higher than desirable pressure loss, only overcome by increasing the size of the engine.

The present invention seeks to provide an integral rocket and ramjet engine which does not suffer from the problems described in the preceding paragraph.

The integral rocket and ramjet engine, as claimed, is provided with a port cover which seals the intake duct from the combustion chamber while the engine operates as a rocket and overcomes problems associated with ejecting the cover by retaining it within the combustion chamber when the engine operates as ramjet, the cover providing a quiet zone which is shielded from the main flow of air into the combustion chamber. Preferably combustion equipment such as fuel manifolds and flame gutters are attached to the cover and become operational when the cover takes up its new position after change-over from rocket to ramjet mode.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
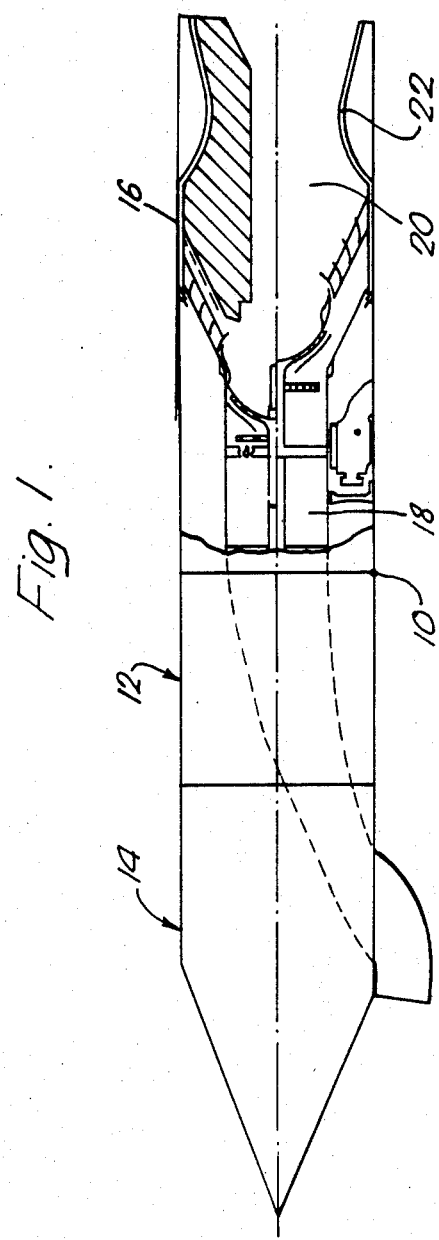
FIG. 1 depicts a part-sectional view of a missile provided with an integral rocket and ramjet engine according to the present invention.

Referring to FIG. 1, a missile 10 comprises a warhead 12, a guidance section 14 and an integral rocket and ramjet engine 16. The engine 16 comprises an intake duct 18, a combustion chamber 20 and a propelling nozzle 22.

Figure 2:
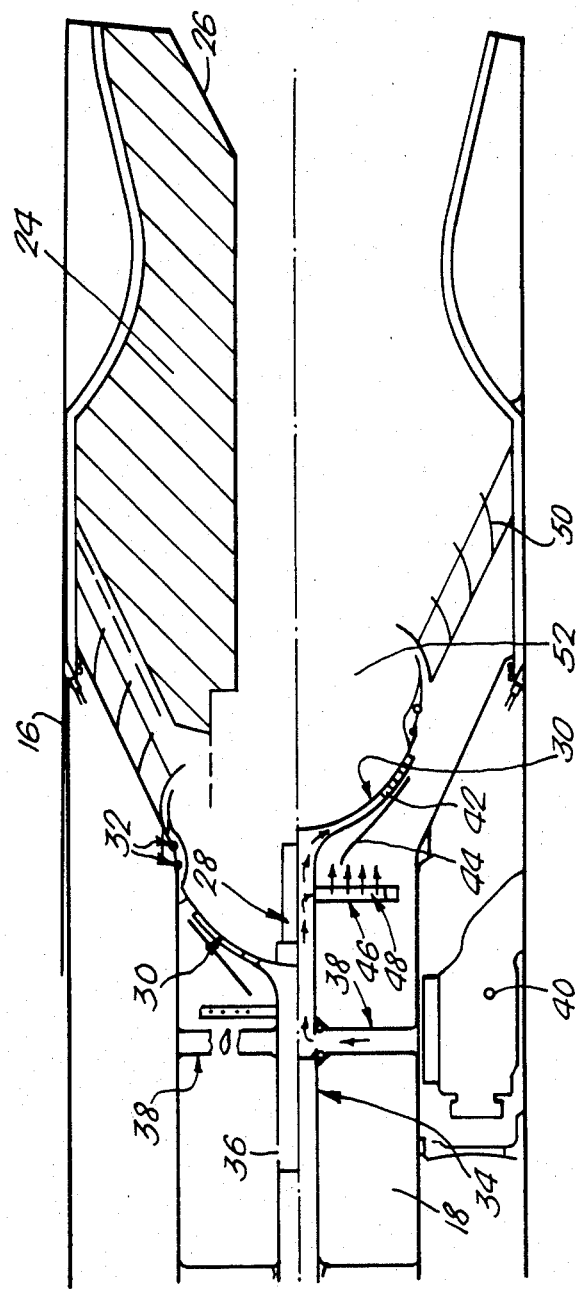
FIG. 2 depicts a more detailed view of the engine shown in FIG. 1.

Referring now to FIG. 2, in which the top half shows the engine 16 in a rocket mode, a charge of solid rocket fuel 24 has incorporated in its shape a nozzle 26 for the efflux from the burning charge to expand through. An igniter means 28 is provided to initiate burning of the charge 24 when the missile 10 is launched. A part-spherical port cover 30 seals the air intake duct 18 in the rocket mode. Two ring seals 32 ensure no efflux from the burning rocket charge 24 may enter the air intake duct 18.

After the rocket charge 24 has substantially burned away, the missile 10 will have reached sufficient velocity for ram air pressure in the intake duct 18 to force the port cover 30 rearward to the position shown in the bottom half of FIG. 2. During this transitional period the rocket nozzle 26 will burn away. As the port cover 30 slides rearward, a pipe 34 which is attached to the port cover at one end and closed at the other also slides rearward to the position shown in the bottom half of FIG. 2. The pipe 34 has a plurality of holes 36 located to line up with fuel feed ducts 38 when the pipe is in the rearward position. The fuel feed ducts 38 carry pressurised fuel from a fuel turbopump 40 into the pipe. As can be seen in the top half of FIG. 2, when the pipe is in the forward position it seals the ends of the fuel feed ducts 38 thereby preventing fuel from entering the pipe. When the holes 36 line up with the fuel feed ducts 38, fuel travels along the pipe 34 to a plurality of primary fuel manifolds 42 located adjacent the port cover 30. The primary fuel manifolds 42 are shielded from the main air flow into the combustion chamber 20 by a shroud 44 which is mounted to the port cover 30. Extending radially outward from the pipe 34 into the intake duct 18 are a plurality of main fuel flow manifolds 46. Each manifold 46 has orifices 48 through which fuel passes into the surrounding air stream.

Downstream of the manifolds 46, an array of flame gutters 50 attached to the port cover extends across the air stream. The flame gutters 50 serve to anchor the main combustion flame and also ensure a smooth gas flow into the combustion chamber 20 from the intake duct 18. When the engine 10 is in the rocket mode, the flame gutters 50 are located adjacent a sidewall of the combustion chamber and then they slide rearward with the port cover 30 during transition to ramjet mode.

When the engine 10 is in the ramjet mode, a portion of the total air flow into the combustion chamber 20 flows between the shroud 44 and the port cover 30 where it picks up fuel issuing from the primary fuel manifolds 42. This primary flow attaches to the port cover 30 and flows between the cover and the flame gutters 50 into a quiet zone 52 which is shielded from the main air flow into the combustion chamber 20 by the port cover 30. This primary flow of air fuel mixture is initially ignited by residual rocket charge burning in the combustion chamber 20 or by other convenient means. The main flow of air flows over the main fuel manifolds 46 where it mixes with fuel issuing from the orifices 48, the mixture then burns in the combustion chamber 20 after being ignited by the primary flame.

I claim:

1. An integral rocket and ramjet engine, comprising:
    an intake duct for aerodynamically compressing air, said intake duct communicating with at least one fuel feed duct extending radially inward into said intake duct from a source of pressurized fuel;
    a propelling nozzle located downstream of said intake duct;
    a combustion chamber located between said intake duct and propelling nozzle;
    at least one port through which said compressed air passes from said intake duct into said combustion chamber;
    at least one port cover corresponding to said at least one port, said at least one port cover being movable between a first rocket position which prevents air from entering said combustion chamber and enables a rocket charge to burn in said combustion chamber, thereby accelerating said engine to a velocity sufficient for ramjet operation, and a second ramjet position axially removed downstream from said first position and within said combustion chamber when said rocket charge is spent to allow compressed air to flow into said combustion chamber, thereby allowing said engine to operate as a ramjet;
    an axially movable pipe extending axially upstream from said port cover along said intake duct, said pipe having first and second ends, said first end being closed and said second end being downstream of said first end and attached to said at least one port cover, said pipe having at least one hole provided therein for selective communication with said at least one fuel feed duct, said at least one hole aligning with said at least one fuel feed duct when said port cover is in said second position, to allow fuel to pass from said at least one fuel feed duct into said pipe, said at least one hole not aligning with said fuel feed ducts when said port cover is in said first position.

2. An engine as claimed in claim 1 wherein one or more fuel manifolds extend radially outward from the pipe into the air flow through the intake duct and introduce fuel into the air flow.

3. An engine as claimed in claim 1 wherein the port cover includes one or more primary fuel supply pipes which terminate in outlet orifices adjacent the flow of air into the combustion chamber.

4. An engine as claimed in claim 3 wherein a shroud is provided which is attached to the port cover, the shroud being spaced from the outlet orifices to enable compressed air from the intake duct to pass over the orifices and thence to a quiet zone.

5. An engine as claimed in claim 1 wherein an array of flame gutters are attached to the port cover and extend across the flow of compressed air into the combustion chamber when the engine operates as a ramjet thereby anchoring flames produced by the combustion of said pressurized fuel.

6. An engine as claimed in claim 5 wherein the array of flame gutters comprise a plurality of conical rings constructed and arranged to direct the gas flow into the chamber radially inward and axially downstream, each ring being located radially outward of the adjacent upstream ring.

7. An engine as claimed in claim 1 wherein one or more seals are provided between the port cover and a surface of the intake duct, when the cover is in the first position, to prevent efflux from the burning rocket charge travelling into the intake duct.

* * * * *